United States Patent [19]
Cha et al.

[11] Patent Number: 5,912,879
[45] Date of Patent: Jun. 15, 1999

[54] BROADBAND TERMINAL EQUIPMENT FOR CONGESTION CONTROL IN THE RING STRUCTURE AND ITS CONTROL METHOD

[75] Inventors: Young-Wook Cha; Jong-Oh Kim; Ik-Kyun Kim; Kyou-Ho Lee; Jong-Arm Jun, all of Daejeon, Rep. of Korea

[73] Assignees: Electronics and Telecommunications Research Institute, Daejeon; Korea Telecom, Seoul, both of Rep. of Korea

[21] Appl. No.: 08/841,554

[22] Filed: Apr. 30, 1997

[30] Foreign Application Priority Data

Oct. 11, 1996 [KR] Rep. of Korea ...................... 96-45467

[51] Int. Cl.[6] ........................... G01R 31/08; G06F 11/00; G08C 15/00
[52] U.S. Cl. ........................... 370/229; 370/235; 370/465
[58] Field of Search ..................................... 370/229, 230, 370/231, 235, 236, 240, 360, 395, 400, 403, 404, 415, 422, 425, 428, 429, 465, 904

[56] References Cited

U.S. PATENT DOCUMENTS

| | | | |
|---|---|---|---|
| 5,136,584 | 8/1992 | Hedlund | 370/395 |
| 5,231,631 | 7/1993 | Buhrke et al. | 370/468 |
| 5,506,839 | 4/1996 | Hatta | 370/229 |
| 5,590,132 | 12/1996 | Ishibashi et al. | 370/236 |
| 5,754,529 | 5/1998 | Heiss | 370/229 |

OTHER PUBLICATIONS

Ernst–Heinrich Goeldner and Manfred N. Huber, "Multiple Access for BISDN", Aug., 1991, IEEELTS, pp. 37–43.

*Primary Examiner*—Chi H. Pham
*Assistant Examiner*—Steven Nguyen
*Attorney, Agent, or Firm*—Jacobson, Price, Holman & Stern, PLLC

[57] ABSTRACT

The present invention relates to a broadband terminal equipment for congestion control in the ring structure and its control method, and the object of the invention is to prevent ATM traffic congestion which can be produced in the ring in order to realize the ATM subscriber premises network having a ring structure.

The invention is provided with a means (313) which stores real time traffic for a while, a means (314) which stores non-real time traffic for a while, a means (312) which notifies a broadband network terminator of network congestion and controls network traffic transmission, an ATM adaptation layer transmission means (317) inclusive of a means (315) which stores self-created real time traffic and a means (316) which stores self-created non-real time traffic, and a means (319) which transmits the self-created real time traffic and non-real time traffic and receives real time traffic and non-real time traffic which are inputted from a front broadband terminal equipment if destined for itself and transmits those traffics to a rear broadband terminal equipment if not destined for itself.

The invention is used in the broadband integrated service network subscriber premises equipment.

6 Claims, 8 Drawing Sheets

BROADBAND TERMINAL EQUIPMENT FOR CONGESTION CONTROL IN THE RING STRUCTURE AND ITS CONTROL METHOD

BACKGROUND OF THE INVENTION

1. Field of the Invention

The present invention relates to a broadband terminal equipment for congestion control in the ring structure and its control method. In particular, the invention relates to a broadband terminal equipment provided with MGFC (Multi-access Generic Flow Control) for preventing congestion between a broadband network terminator and a broadband terminal in the multi-access ATM (Asynchronous Transfer Mode) subscriber premises network having a single ring structure and to a multiaccess generic flow control method.

2. Description of the Conventional Art

The B-ISDN (Broadband Integrated Service Digital Network) aims at accommodating not only audio and slow data service provided in the conventional public network but also video and fast data service. For accommodation of slow and fast services, the ITU-T introduced ATM as a transfer method of the B-ISDN.

Figure 1:
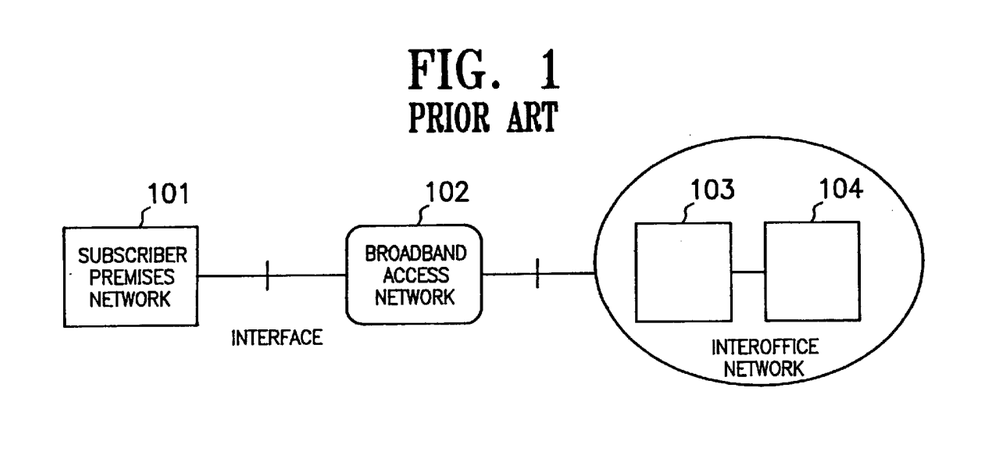
FIG. 1 is a schematic diagram of a broadband integrated service network to which the present invention is applied.

As shown in FIG. 1 the B-ISDN is divided into a subscriber premises network(101), a broadband access network (102) and an interoffice network (103, 104) according to the equipment which forms a network and its physical position.

Figure 2A:
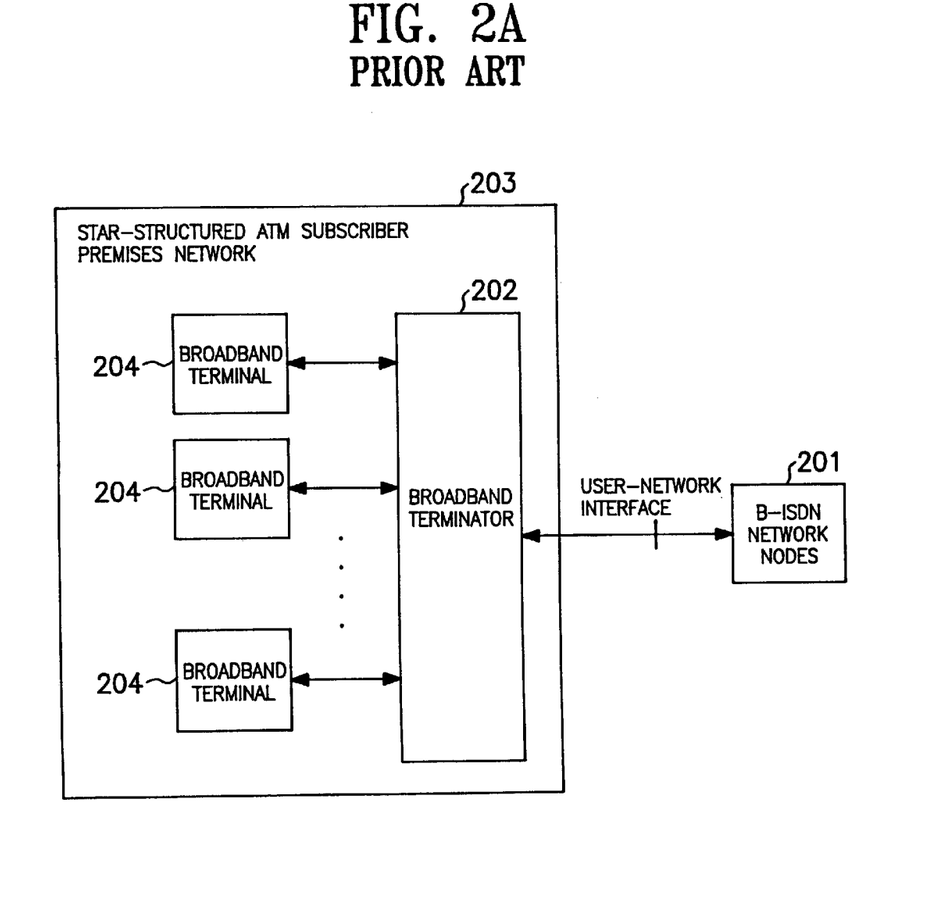
FIG. 2A to 2C are schematic diagrams of general subscriber premises network.
Figure 2B:
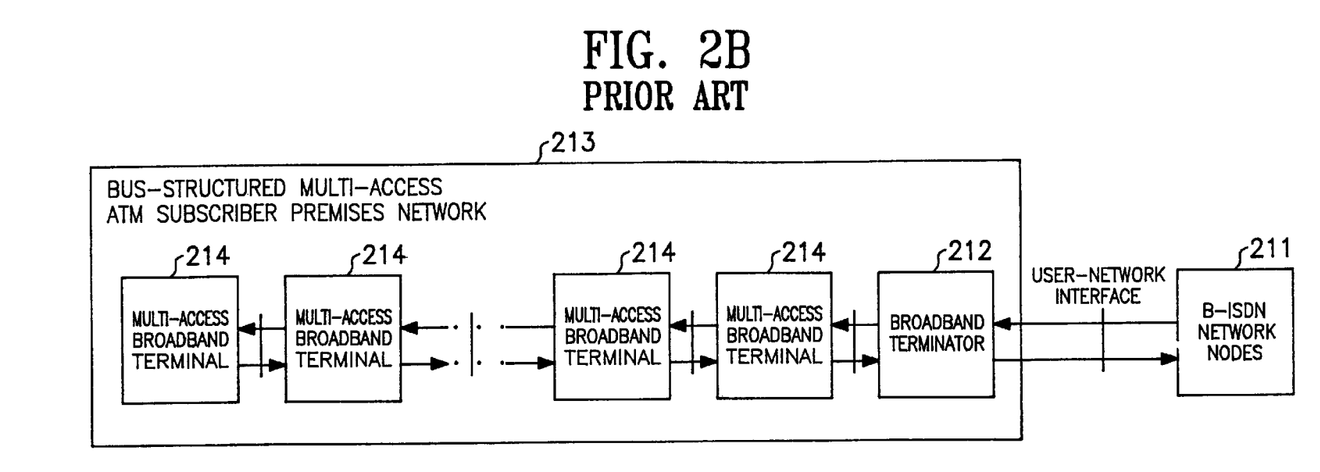
Figure 2C:
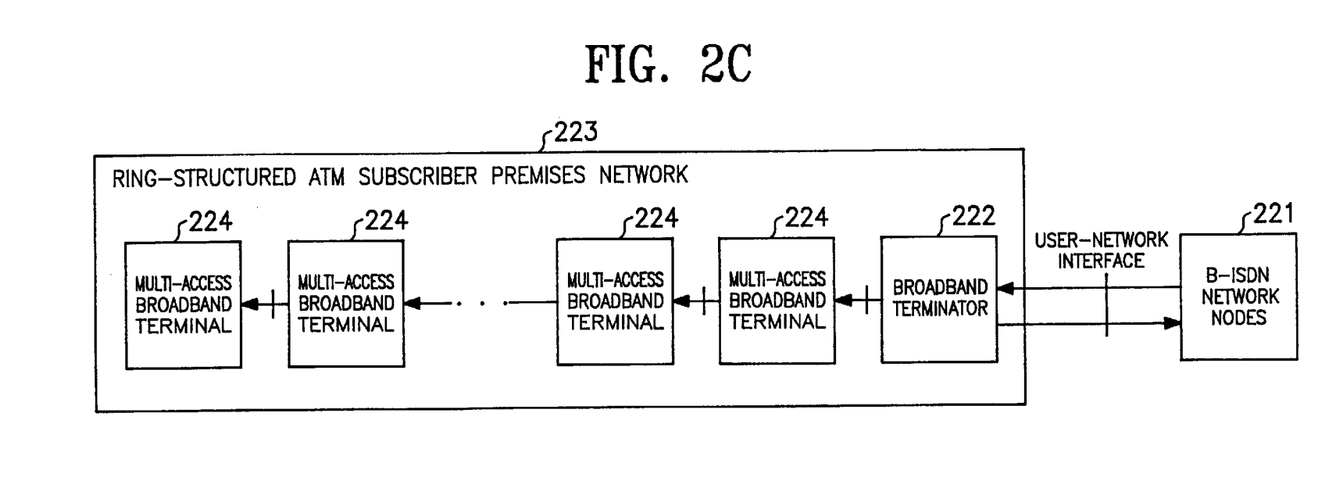

The subscriber premises network(101) comprises broadband terminal equipments and a network terminator. In the subscriber premises network (101), there generally exist several broadband terminals such as PC, set-top box and video telephone (204, 214, 224). As the method of connecting them to one user network interface of the public network nodes (201, 211, 221), star structure (203), bus structure (213) and single ring structure (223) are considered, as shown in FIG. 2. The present ATM-related technical standards are, for the most part, focused on the physical point-to-point formation of star structure (203).

GFC(Generic Flow Control) for congestion control of point-to-point formation in the star structure (203) is decided as a standard in the study group 13 of ITU-T, but multi-access ATM technology of shared media base like a ring or bus structure is wholly lacking.

In the star-structured ATM subscriber premises network (203), a broadband terminator (202) which functions like an ATM switch or a multiplexer must be used and so it is suited for the structure of large-scale business subscriber premises network. In the Case of small-scale business subscribers and residential subscribers it is economical to build the subscriber premises network with only an ATM card which performs a multi-access function without investing in the ATM switch or multiplexer in the early stage. The traffic of these subscribers will consist mainly of a downward traffic to subscriber premises network from public network. As it does not require high reliability like public network, the multi-access ATM subscriber premises network (223) having a single :ring structure is efficient to build a subscriber premises network economically.

SUMMARY OF THE INVENTION

Therefore, an object of the present invention is to provide a broadband terminal equipment provided with MGFC (Multiaccess Generic Flow Control) for prevention of ATM traffic congestion which can be produced in the ring and its control method in order to realize a ring-structured ATM subscriber premises network.

DETAILED DESCRIPTIONS OF THE INVENTION

In the system where a number of broadband terminal equipments are formed in ring structure in a broadband network terminator, the present invention aimed at achieving the object is characterized by being provided with a means which receives input of real time traffic from a front broadband terminal equipment, stores it for a while and outputs it, a means which receives input of non-real time traffic from the front broadband terminal equipment stores it for a while and outputs it, a means which notifies a broadband network terminator of network congestion, receives a network congestion control signal from the broadband network terminator and controls network traffic transmission, an asynchronous transfer mode adaptation layer (AAL) transmission means inclusive of a means which stores real time traffic created in the own broadband terminal equipment and a means which stores non-real time traffic created in the own broadband terminal equipment, an AAL reception means which receives traffic destined for itself and a means which transmits traffic to a rear broadband terminal equipment by adding self-created real time traffic and non-real time traffic stored in the AAL transmission means, receives input of traffic stored in the real time traffic temporally storing means and in the non-real time traffic temporally storing means from the rear broadband terminal equipment, and drops it to the AAL reception means if destined for itself and transmits it to the rear broadband terminal equipment if not destined for itself.

Moreover, in the congestion control method applied to a subscriber premises network system where a number of broadband terminal equipments (B-TE*) which perform a multiaccess function are formed in ring structure in a multiaccess broadband network terminator (MB-NT), the present invention is characterized by comprising a first stage in which if a broadband terminal equipment is notified of the occurrence of congestion or the removal from the storing means, it creates a system management cell which informs the occurrence of congestion or the removal and transmits system management cell to a broadband network terminator by selecting a logical star-type management channel, a second stage in which if the broadband network terminator receives the system management cell which informs the occurrence of congestion from the broadband terminal equipment after the first stage is performed, it creates a system management cell for temporary suspension of traffic transmission and, if it receives a system management cell which informs the removal of congestion, it creates a system management cell for resumption of traffic transmission and transmits it to the broadband terminal equipment by selecting a broadcast-type management channel and a third stage in which if the broadband terminal equipment receives a system management cell from the broadband network terminator after initialization of a counter which shows congestion, it discards the received system management cell in case it in destined for itself, and temporarily suspends the transmission of self-created traffic if the system management cell shows the occurrence of congestion in case it is not destined for itself or resumes the transmission of temporarily suspended traffic if the system management cell shows the removal of congestion and transmits the received system management cell to a rear broadband terminal equipment.

Now, one embodiment of the present invention will be described in detail by reference to FIGS. 3 to 8.

Figure 3:
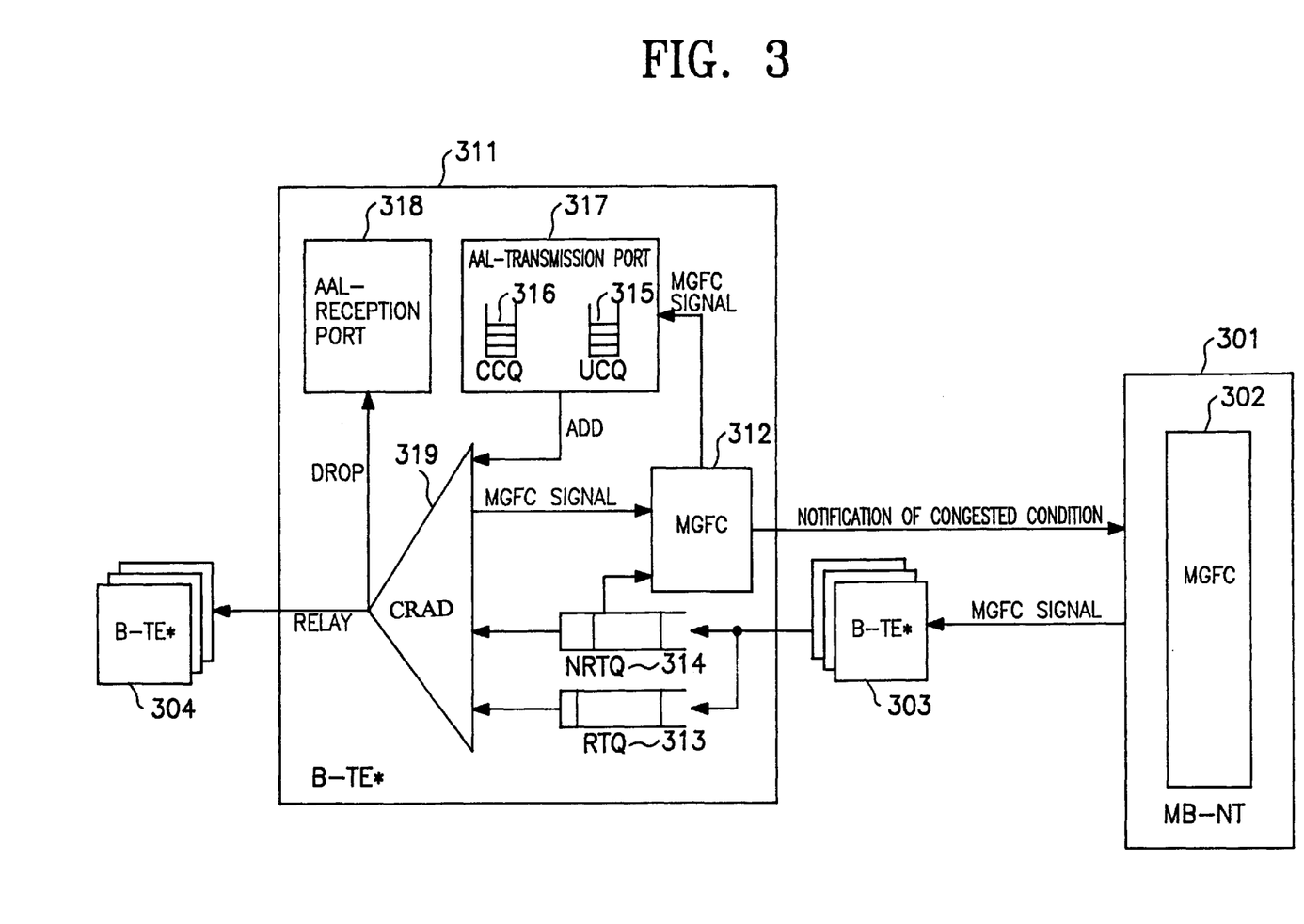
FIG. 3 is a schematic diagram of a broadband terminal equipment for congestion control according to the present invention.

FIG. 3 is a schematic diagram of a broadband terminal equipment provided with multiple access generic flow control (MGFC) for prevention of congestion in the ATM subscriber premises network having a single ring structure according to the present invention.

In FIG. 3, 301 shows a multi-access broadband network terminator (MB-NT), 302 and 312 are multi-access generic control parts, 303, 304 and. 311 are broadband terminal equipment *(B-TE*), 313 is a real time traffic queue, 314 is a non-real time traffic queue, 315 is an uncontrolled connection queue, 316 is a controlled connection queue, 317 is an ATM adaptation layer (SAL) transmission part and 318 is an AAL reception part.

Congestion control is performed between the multiaccess broadband network terminator (MB-NT) (301) and the broadband terminal equipment *(B-TE*) (311) which has a multi-access function.

The MB-NT(301) has a multi-access terminating function in addition to the function of a broadband network terminator 2 (B-NT2) and a broadband network terminator 1 (B-NT1) which are provided for in the recommendation 1.413 of ITU-T Study Group 13.

B-TE*s (303, 304, 311) are terminals loaded with an ATM card to which multi-access interface function is added in addition to the existing star-structured terminal function.

Congestion control is in the state of causing loss of a cell in the ring as B-TE*s transmit traffic in contravention of bandwidth negotiated by call/connection acceptance control. In the case where B-TE*(311) receives a cell from B-TE*s (303) or MB-NT(301) located in the upper part of the ring, it drops the cell to the AAL reception part (318) from the cell relay and add-drop part (CRAD) (319) if destined for itself, and relays the cell to a downward ring via the cell relay and add/drop part (CRAD) (319) if not destined for itself. Moreover, it performs drop and relay function at the same time for a multicasting cell.

Drop and relay of the cell in each B-TE* uses the information of VCI (Virtual Channel Identifier) and VIP (Virtual Path Identifier) in the header of ATM cell.

In order to efficiently process ATM traffic having various traffic characteristics, the following four kinds of queues are used in each B-TE*(311) which is a multi-access broadband terminal. RTQ (Real Time Traffic Queue) (313) is a queue for real time traffic received through the ring. Real time traffic cells are traffic more sensitive to delay than to loss. They are traffic like video and voice. This queue achieves cell scheduling in the cell relay and add/drop part (319) in the order of the highest priority. It has the size of a cell to synchronize in the case where the AAL transmission part (317) transfers a real time traffic cell the moment it arrives.

NRTQ(Non-Real Time Traffic Queue) (314) is a queue for non-real time traffic received through the ring. Non-real time traffic cells are traffic sensitive to loss. They are data traffic like file transmission.

UCQ (Uncontrolled Connection Queue) (315) which is self-created in the B-TE*(311) is a queue used for buffering before it is added to the cell relay and add/drop part (319) in the AAL transmission part (317). The uncontrolled connection queue (315) is used for the real time traffic created in the B-TE*.

CCQ (Controlled Connection Queue) (316) which is self-created in the B-TE*(311) :Ls a queue used for buffering before it is added to the add/drop part (319) in the AAL transmission part (317). The controlled connection queue is used for the non-real time traffic created in the B-TE*.

The order of priority for scheduling these queues in the cell relay and add/drop part (319) is real time traffic queue (RTQ) (313), uncontrolled connection queue (UCQ) (315), non-real time traffic queue (NRTQ) (314) and controlled connection queue (CCQ) (316). The real time traffic cells which are buffered to the real time traffic queue (RTQ) (313) and the uncontrolled connection queue (UCQ) (315) are processed in preference to the non-real time traffic cells, and therefore there is almost no instance where overflow is caused in the real time traffic queue (313) and uncontrolled connection queue (315). The non-real time traffic cells created in the B-TE* are locally controllable by the control of transmission to the AAL transmission part (317).

The cells which are buffered to the non-real time traffic queue (NRTQ) (314) are created by the front B-TE* (303). By reason that traffic is burst, overflow is caused in the non-real time traffic queue (NRTQ) (314) unless proper congestion control mechanism is provided.

In the multi-access broadband network terminator (MBNT) (301) and in each broadband terminal equipment (B-TE*), multi-access generic flow control parts (302) (312) are used to control traffic congestion. To perform a multi-access generic flow control function, a logical star-type management channel and a broadcast-type management channel are allotted to between each B-TE* and MB-NT (301) by expanding a meta signaling function provided in the SG 11 of ITU-T. The occurrence and removal of congestion are notified by using the system management cell in the logical star-type management channel.

Figure 4:
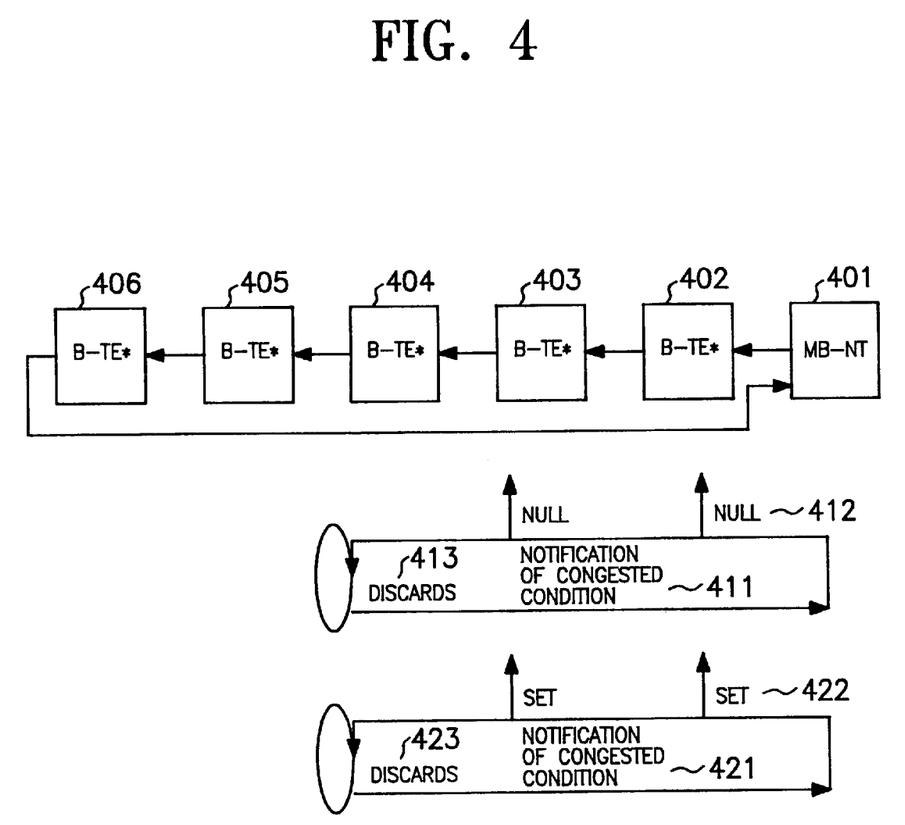
FIG. 4 is an outlined flow chart of multi-access generic flow control according to the present invention.

FIG. 4 shows a congested condition notification flow chart in the B-TE* and the flow of multi-access generic flow control command in the MB-NT.

Notification (411,421) of congested condition to the MB-NT from the B-TE* uses the logical star-type management channel and multi-access generic flow control (MGFC) signals (306, 412, 422) to the terminal from the MB-NT use the broadcast-type management channel. There are command words "SET" and "NULL" in multi-access generic flow control signals.

The NULL command (412) is a command to suspend transmission of non-real time traffic from the terminal and the SET command (422) is a command to resume transmission of traffic.

In the case where the cell is buffered to the extent of the threshold of non-real time traffic queue (NRTQ) (314), each B-TE* provides that it is congested. Such a judgement is formed by the multi-access generic flow control part (MGFC) (312) of the B-TE*.

B-TE* (404) in which congestion is produced notifies (411) it to the MB-NT (401) The MB-NT (401) transmit a command (412) "NULL", which is a multi-access generic flow control (MGFC) signal (306), to the B-TE*s (402, 403) located in front of the congested B-TE* (404) to temporarily intercept the creation of non-real time traffic so as to keep the non-real time traffic queue (NRTQ) from being congested. The B-TE* (404) released from congestion notifies (421) it to the MB-NT(401). The MB-NT(401) transmits a command (422) "SET", which is a multi-access generic flow control (MGFC) signal (306), to the B-TE*s (402, 403) located in front of the B-TE* (404) released from congestion to resume the creation of non-real time traffic.

In the case where the B-TE*(404) which notified a congested condition receives (412, 422) a system management cell having the MGFC signal, it discriminates a location identifier, and discards (413, 423) the received system management cell if it is the same as its own location identifier so as to keep those B-TE*s located in behind from being subjected to the influence thereof.

Figure 5:
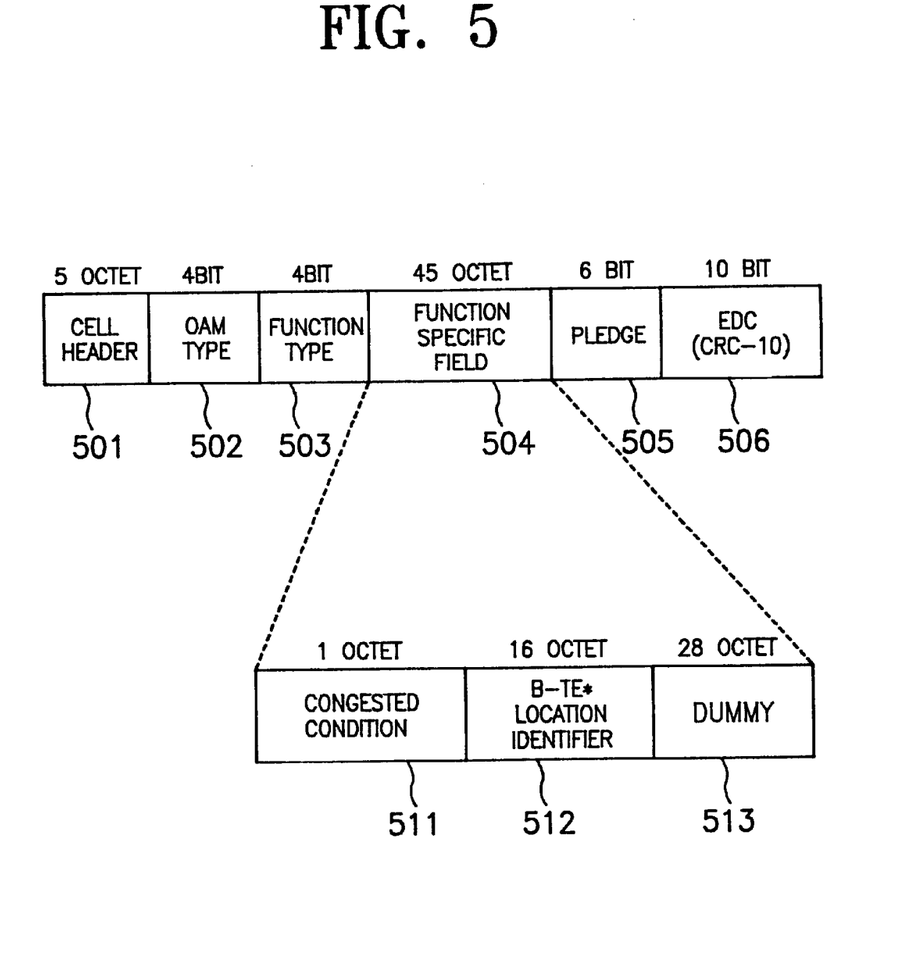
FIG. 5 is a format diagram of a system management cell for multi-access generic flow control according to the present invention.

FIG. 5 is a format diagram of a system management cell for notification of a congested condition between terminals and MB-NT.

In the system management cell, a congested condition subfield (511) within the function specific field (504) indicates the occurrence or removal of congestion and a B-TE* location identifier (512) indicates the position of a B-TE* associated with congested condition.

Figure 6:
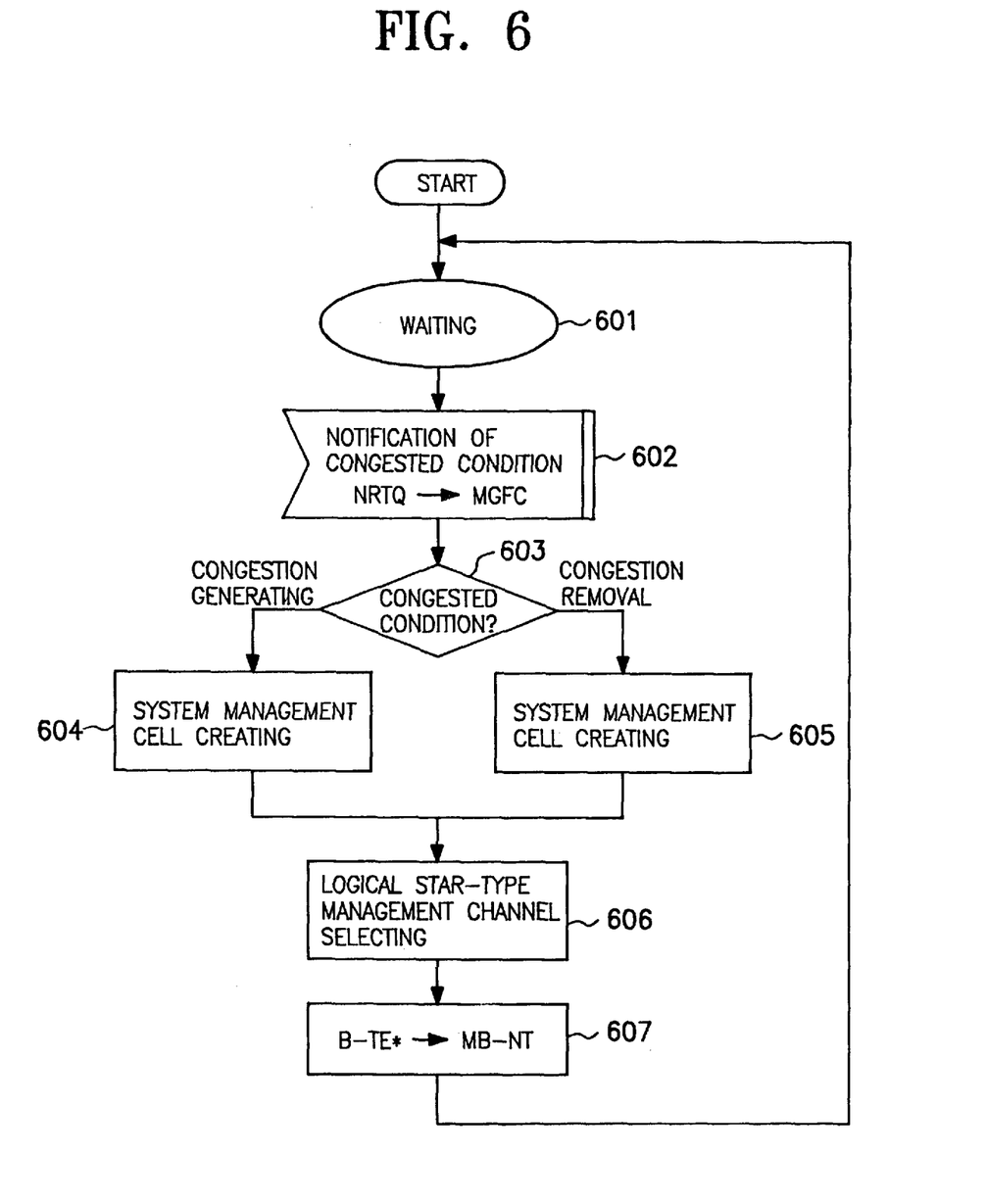
FIG. 6 is a flow chart showing a notification of congested condition of a broadband terminal equipment according to the present invention.

FIG. 6 shows a procedure to be taken for notification of a congested condition in the B-TE* according to the present invention. When the B-TE* is notified (602, 603) of the occurrence of congestion from the non-real time traffic queue (NRTQ) (314) while waiting (601) for notification thereof, the multi-access generic flow control (MGFC) part creates (604) a system management cell provided with information on the location identifier and congested condition of the B-TE*. The B-T* returns to standby status (601) after notification (607) of the created system management cell to the MB-NT(607) by selecting (606) the logical star-type management channel created by the meta signaling function.

When the B-TE* is notified (602, 603) of the removal of congestion from the non-real time traffic queue (NRTQ) (314), the multi-access generic flow control part creates (605) a system management cell provided with information on the location identifier and congested condition of the B-TE* released from congestion. The B-TE* returns to standby status (601) after notification (607) of the created system management cell to the MB-NT by selecting (606) the logical star-type management channel created by the meta signaling function.

Figure 7:
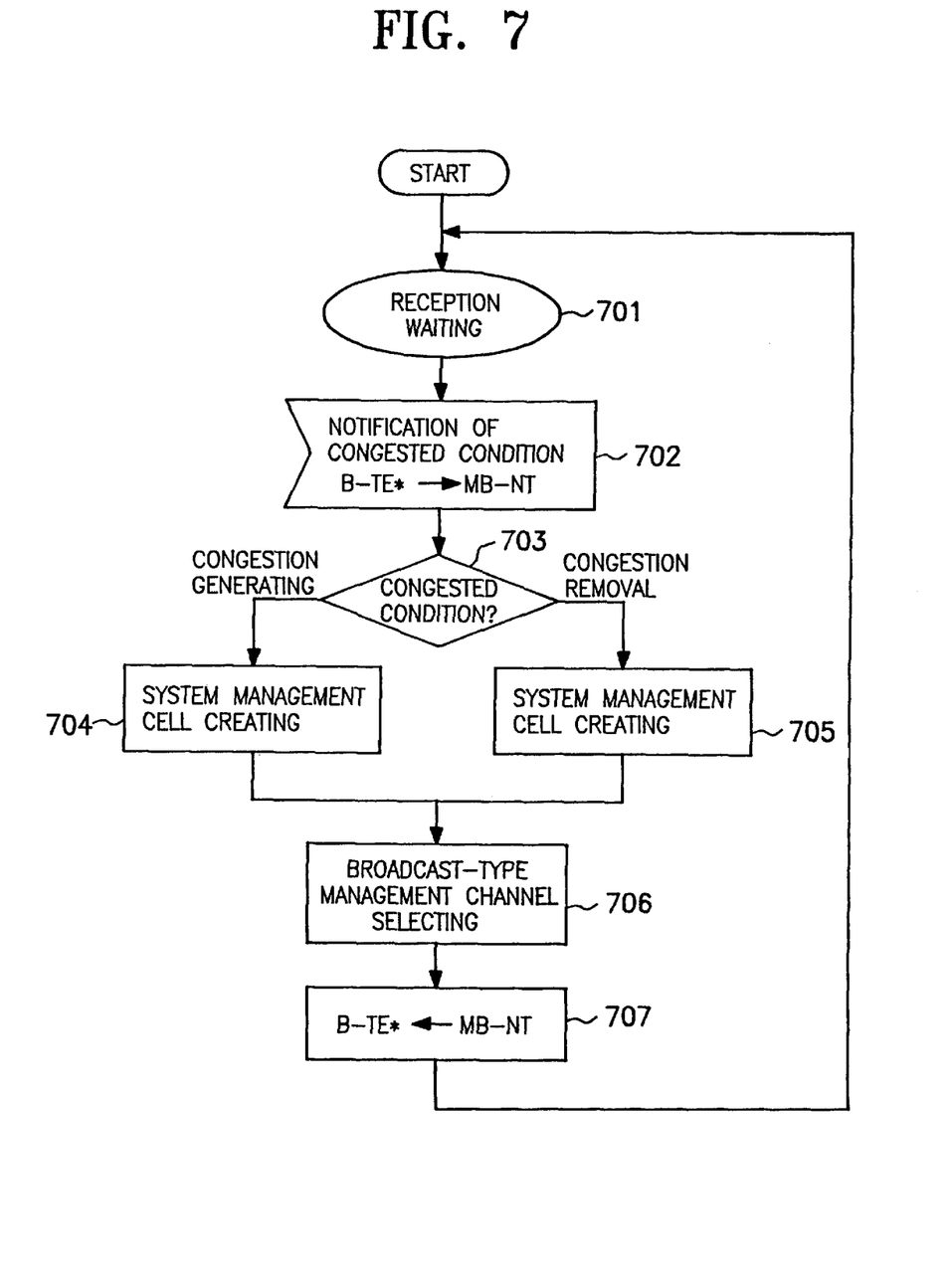
FIG. 7 is a flow chart showing generic flow control and processing of a multi-access broadband network terminator according to the present invention.

FIG. 7 shows a procedure to be taken for multi-access generic flow control by the MB-NT according to the present invention.

When the MB-NT receives (702) a system management cell from the B-TE* while waiting (701) for reception thereof, it discriminates (703) a congested condition using the received system management cell. In the case where the congested condition sub-field of the received system management cell notifies that congestion is produced, the MB-NT codes a command "NULL" in the generic flow control (GFC) field of a system management cell header to temporally suspend the transmission of those cells in the controlled connection queue of AAL transmission part to all B-TE*s located in front of the congested B-TE* and loads (704) the location identifier of the B-TE* on the location identifier sub-field of the system management cell.

The system management cell transferred to each B-TE* from the MB-NT uses the broadcast-type management channel (706) allotted by the meta signaling function In the case where the congested condition sub-field of the received system management cell notifies that congestion is removed, the MB-NT codes a command "SET" in the GFC field of the system management cell header to resume the transmission of those cells in the controlled connection queue (CCQ) to all the B-TE*s in front of the B.-TE* released from congestion and loads (705) the location identifier of the B-TE* which notified congestion on the system management cell. The MB-NT which transmitted (707) the system management cell to the B-TE*s returns to standby status (701) for reception of the next system management cell.

Figure 8:
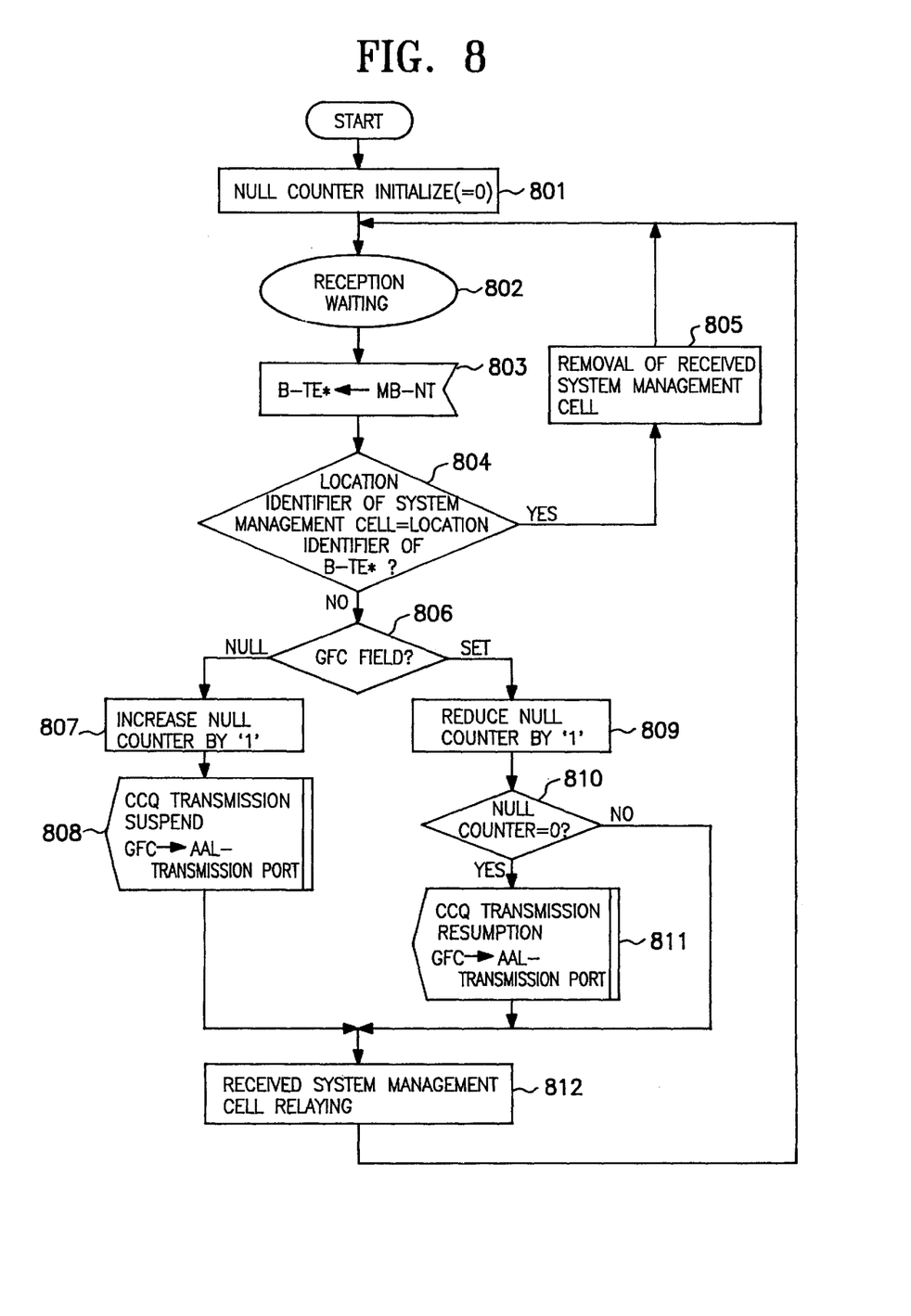
FIG. 8 is a flow chart showing multi-access generic flow control and processing of a broadband terminal equipment according to the present invention.

FIG. 8 shows a procedure to be taken for multi-access generic flow control of the B-TE* according to the present invention.

In order to deal with congestion which can be produced at the same time in several E-TE*s, the B-TE* keeps a null counter and initializes it to "0" when booted. When the BTE* receives (803) the system management cell from the MB-NT while waiting for reception thereof, it performs the following procedure.

It discriminates (804) a location identifier sub-field in the received system management cell and discards the received system management cell if it is the same as an own location identifier not to produce an effect on those B-TE*s in the lower part of the ring. In the case where the location identifier of the received system management cell is not B-TE* itself, it inspects (806) the GFC field of the system management cell header. In the case where the GFC field is NULL, it increases (807) the NULL counter by '1' and suspends the transmission of the cell stored in the controlled connection queue (CCQ) of the AAL transmission part. In the case where GFC field is SET, it reduces (809) the NULL counter by '1'. Only in the case where the reduced NULL counter is '0' (810), it allows resumption (811) of the transmission of the cell stored in the controlled connection queue (CCQ) to the AAL transmission part. After it performed such a multi-access flow control function, it relays (812) the received system management cell for the B-TE* in the next part and returns to standby status (802) for reception of the system management cell.

Since the present invention allows various transpositions, transformations and changes for those who have common knowledge in the technical field to which the present invention belongs within the radius of its technical idea, it is not limited to the above embodiment and to the drawings attached hereto.

The present invention as heretofore described makes it possible to prevent the congestion of ATM traffic which can be produced in the ring structure, and so it has the effect of actualizing ring-structured ATM subscriber premises networks.

What is claimed is:

1. In the system where a number of broadband terminal equipments are formed in a ring structure in a broadband network terminator, a broadband terminal equipment comprising:

a real time traffic temporally storing means for receiving an input of real time traffic from a front broadband terminal equipment, storing the input of the real time traffic for a while and outputting the input of the real time traffic;

a non-real time traffic temporally storing means for receiving an input of non-real time traffic from the front broadband terminal equipment, storing the input of the non-real time traffic for a while and outputting the input of the non-real time traffic;

a first means for notifying the broadband network terminator of network congestion, receiving an input of a network congestion control signal from the broadband network terminator and controlling a network traffic transmission;

an AAL transmission means including a means for storing a real time traffic created in the own broadband terminal equipment and a means for storing a non-real time traffic created in the own broadband terminal equipment;

an AAL reception means for receiving a traffic destined for the AAL reception means; and a second means for transmitting a traffic to a rear broadband terminal equipment by adding the self-created real time ard non-real time traffic stored in the AAL transmission means and receiving the input of traffic stored in the real time traffic temporally storing means and in the non-real time traffic temporally storing means from a front broadband terminal equipment, and dropping the input of the traffic to the AAL reception means if destined for the second means and transmitting the input of the traffic to the rear broadband terminal equipment if not destined for the second means.

2. In a congestion control method applied to a subscriber premises network where a number of multi-access functioning broadband terminal equipments are formed in a ring structure in a multi-access broadband network terminator, the congestion control method comprising the steps of:

a first stage in which if a broadband terminal equipment is notified of the occurrence or the removal thereof from a storing means, wherein a broadband terminal equipment creates a system management cell which informs the occurrence of congestion or the removal thereof and transmits the system management cell to a broadband network terminator by selecting a logical star-type management channel;

a second stage in which if the broadband network terminator receives the system management cell which informs the occurrence of congestion from the broadband terminal equipment after the first stage is performed, wherein the broadband network terminator creates a system management cell for temporary suspension of traffic transmission, and creates a system management cell for resumption of traffic transmission if the broadband network terminator receives the system management cell which informs the removal of congestion and transmits the system management cell to the broadband terminal equipment by selecting a broadcast type management channel; and a third stage in which if the broadband terminal equipment receives a system management cell from the broadband network terminator after initialization of a counter which shows congestion, wherein the broadband terminal equipment discards the received system management cell in the case where the system management cell is destined for itself, and temporally suspends the transmission of self-created traffic if the system management cell slows the occurrence of congestion in the case where the system management cell is not destined for itself or resumes the transmission of the temporally suspended traffic if the system management cell shows the removal of congestion, and transmits the received system management cell to a rear broadband terminal equipment.

3. The congestion control method as defined in claim 2, characterized by that the system management cell comprises a congested condition sub-field which indicates the occurrence or removal of congestion in a function specific field and a B-TE* location identifier field which indicates the position of a broadband terminal equipment connected with a congested condition.

4. The congestion control method as defined in claim 3, characterized by that the first stage comprises:

a stage in which if the broadband terminal equipment is notified of the occurrence of congestion from the non-real time traffic queue while waiting for notification thereof, it creates a system management cell provided with information on the B-TE* location identifier and congested condition, a stage in which the broadband terminal equipment notifies the created system management cell to the broadband network terminator by selecting a logical star-type management channel created by a meta signaling function for notification of congestion a stage in which the broadband terminal equipment creates a system management cell provided with information on the congestion removed B-TE* location identifier and congested condition if the non-real time traffic queue notifies that congestion is removed a stage in which and broadband terminal equipment notifies the created system management cell to the broadband network terminator by selecting the logical star-type management channel created by the meta signaling function and returns to standby status for notification of congestion.

5. The congestion control method as defined in claim 4, characterized by that the second stage comprises:

a stage in which if the broadband network terminator receives a system management cell from the broadband terminal equipment while waiting for reception thereof, it discriminates a congested condition by means of the received system management cell, a stage in which if the broadband network terminator is notified of the occurrence of congestion from the congested condition sub-field of the received system management cell, it codes a command "NULL" in the generic flow control (GFC) field of a system management cell header to temporally suspend the transmission of self-created non-real time traffic to all B-TE*s located in front of the congested BTE* and transmits a system management cell created by loading a location identifier of the B-TE* which notified congestion to the broadband terminal equipment using a broadcast-type management channel allotted by the meta signaling function and a stage in which if the broadband network terminator is notified of the removal of congestion from the congested condition sub-field of the received system management cell, it codes a command "SET" in the GFC field of a system management cell header to resume the transmission of temporarily suspended self-created non-real time traffic to all B-TE*s located in front of the B-TE* released from congestion and transmits a system management cell created by loading the location identifier of the B-TE* which notified congestion to the broadband terminal equipment.

6. The congestion control method as set forth in claim 5, characterized by that the third stage comprises:

- a stage in which the broadband terminal equipment initializes a NULL counter to '0' when booted to keep a congested condition produced from several broadband terminal equipments,
- a stage in which if the broadband terminal equipment receives a system management cell from the broadband network terminator while waiting for reception thereof, it discriminates a location identifier sub-field in the received system management cell,
- a stage in which if the location identifier of the received system management cell is the same as an own location identifier, the broadband terminal equipment discards the received system management cell and inspects the GFC field of the system management cell header if the location identifier of the received system management cell is not B-TE* itself and
- a stage in which the broadband terminal equipment increases the NULL counter by '1' and suspends the transmission of self-created non-real time traffic if the GFC field is NULL which shows the occurrence of congestion, and reduces the NULL counter by '1' if the GFC field is SET which shows the removal of congestion and, only in the case where the reduced counter is '0', resumes the transmission of self-created non-real time traffic and transmits the received system management cell to the next broadband terminal equipment.

* * * * *